Patented Aug. 16, 1938

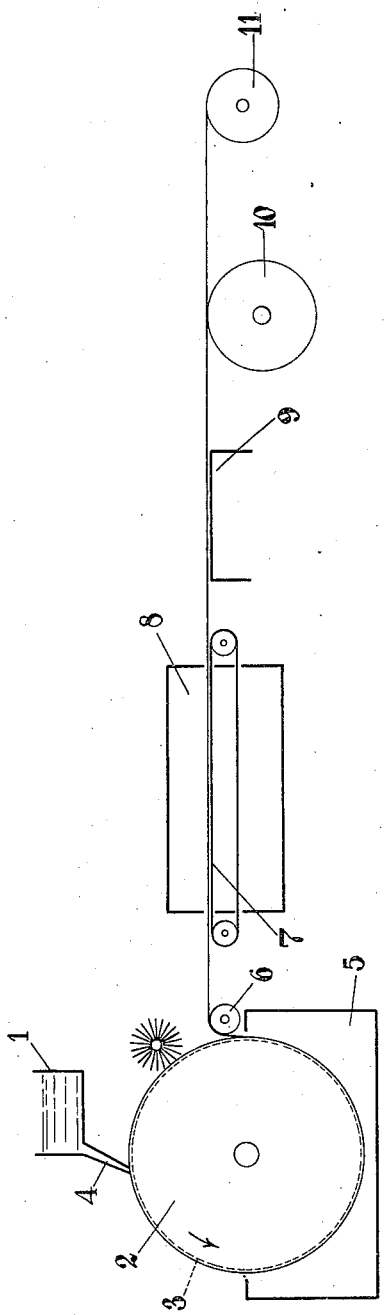

2,127,070

UNITED STATES PATENT OFFICE 2,127,070

MANUFACTURE OF RUBBER THREAD

Ugo Pestalozza, Milan, Italy, assignor to Societa Italiana Pirelli, Milan, Italy Application February 9, 1935, Serial No. 5,856
In Great Britain February 13, 1934

4 Claims. (Cl. 18—54)

This invention relates to the manufacture of elastic rubber thread, strip or like filamentary material from aqueous rubber dispersions.

It has been proposed to produce rubber thread from latex and like rubber dispersions by continuously flowing the dispersion into a number of grooves provided to receive it in a surface continuously moving in a direction parallel to the direction of length of the grooves, the deposit of dispersion in the grooves being caused to dry therein and being thereafter removed for vulcanization and finishing.

In this procedure, however, drying of the deposited latex takes place only through the exposed surface in the groove, and in consequence, since ready removal of the dried thread from the groove requires a condition of dryness on the inner surfaces also of the thread (that is to say those surfaces which are in contact with the walls of the groove), a practical limitation is placed upon the thickness of the latex deposit in relation to the width of the groove.

This fact has been recognized and in order to take it into account and at the same time produce threads of a thickness exceeding that of the film satisfactorily dryable as above in the groove, the deposition of the dispersion in the groove has been proposed to be effected in successive stages, causing the partial deposit at each stage to dry before the next is applied, until the required thickness of deposit is reached in the groove. Thus, it has been proposed to traverse the grooved surface past a series of latex distributors alternated with driers for the partial deposits of latex in the groove, removing the so-built up thread from the grooves after it has passed the last drier.

This procedure, however, calls for the use of grooved surfaces which are very long and necessarily regular, and in consequence the plant requisite for the process is expensive to install. Also, the procedure, although apparently simple, is in practice somewhat troublesome.

The object of the present invention is to provide an improved process of the above type wherein an aqueous dispersion is deposited in a groove and caused to solidify therein, the said improved process being characterized by increased ease and speed of operation and by the possibility moreover of utilization of the same grooved surface for the production of various sizes of threads of the same general configuration of cross section.

According to the invention, a process for making rubber thread, strip and like filamentary material of a predetermined cross-sectional area, comprises depositing in fluid condition in a forming groove a quantity of heat-sensitized aqueous rubber dispersion sufficient upon subsequent mass-setting and drying to give a solid rubber filament of the predetermined cross-sectional area, the groove being progressively moved past a nozzle directing a fine stream of the dispersion into the groove, mass-setting the deposit in the groove by applying heat to it therein, stripping the resulting filament from the groove prior to drying the same and drying the stripped filament, with or without vulcanizing the filament according to whether unvulcanized or vulcanized rubber dispersion is employed respectively in the process.

By a heat-sensitized dispersion, as the expression is employed herein, is meant a dispersion which although stable against coagulation at normal temperature becomes unstable upon being raised to a predetermined elevated temperature so as at this temperature to mass set, that is to say to a homogeneous solid containing the whole or a substantial proportion of the water of the initial dispersion. Dispersions of this character are employed in the processes disclosed in the specifications of United States Patents No. 1,717,248 and No. 1,750,540 and British Patents No. 292,964 and No. 335,621.

It will be appreciated that the process of the present invention is essentially distinguished from the prior proposal referred to above, in that the deposit of dispersion in the groove coagulates or sets (gels) with inclusion of a substantial part at least of its water in contrast to coagulating simply as the result of drying out of the water, and that it is by reason of this distinction that in the first place it is possible to avoid altogether the difficulty referred to of drying the groove-contacting surfaces of the deposit for ready removal of the filament from the groove, and secondly it is possible to effect the deposit of the whole thread or other filament, irrespective of count or cross-sectional size, in one operation in contrast to the several-stage procedure of the prior proposal.

A preferred method of applying heat to the deposit of dispersion in the groove is by heating the surface carrying the grooves so that the dispersion receives the necessary heat from the walls of the groove. Alternatively, or if necessary, in addition to this, the deposit of dispersion in the groove may be passed through a heated atmosphere. The temperature of heating employed is sufficient, as will be understood, to raise the temperature of the dispersion in the groove to the temperature at which it is set to coagulate.

As indicated, the necessary drying of the coagulated thread is effected after the removal of the thread from the grooved surface. By this means the total length of the grooved surface requisite for continuous operation is minimized and drying moreover is more rapid if the thread is out of the groove. The coagulated filamentary deposits are withdrawn from the grooved surface in wet condition and then dried, for example by passage on a conveyor through a drying chamber through which heated air is continuously circulated.

From the drying chamber the thread may pass on to a vulcanizing drum and thence, via the usual dusting and other finishing plant, to a reel for storage or use.

The process may be carried out conveniently and satisfactorily as follows, using for example a form of apparatus such as that which is illustrated diagrammatically in the accompanying drawing which will therefore be referred to in describing the process.

A suitable heat-sensitized latex is prepared and this is caused to flow from a reservoir 1 situated above a horizontally disposed grooved cylinder 2, into the grooves 3 in the latter, flowing into these grooves from the reservoir by way of small tubes 4, for example of glass, having their outlet ends directed into the grooves. The several tubes, which are in effect nozzles, correspond in number to the grooves into which they deliver and their outlet ends are tapered and accommodated between the walls of the grooves so that the fine streams of latex issuing from the orifices of the tubes are delivered directly and immediately into the channel of the groove. The grooved cylinder is heated and as the streams of latex are delivered on to it, it is revolved about its axis in the direction of outflow of latex from the tubes. By varying the speed of revolution of the cylinder in relation to the speed of outflow of the latex, or vice versa, the thickness of deposit of latex in the grooves may be regulated as required according to the desired ultimate thickness of the thread to be produced.

The deposits of latex coagulate in the grooves of the cylinder by the heat imparted thereby and in this connection it may be stated that the temperature to which the cylinder is heated is preferably some degrees higher than the coagulation temperature of the dispersion. Also, to expedite the process the coagulating deposits on the cylinder may be passed, still in position in the grooves, through a heated chamber, the lower part (for example the lower half) of the cylinder revolving for this purpose within an enclosing casing 5 containing hot air.

By the time the latex deposits on the cylinder reach the point of emergence from the heated chamber they have become sufficiently coherent to be stripped from the grooves and passed on, via a stripping roller 6 revolving at the speed of the grooved cylinder in peripheral contact therewith, to an endless band conveyor 7 whereon they remain in parallel spaced relationship to one another and are fed forward through a drying room 8 and thence on to a dusting apparatus 9. From thence the threads are fed forward to a vulcanizing cylinder 10 and finally on to reels 11 for subsequent further treatment as usual.

The conveyor should move at a rate not less than the common peripheral speed of the grooved cylinder and the stripping roller; otherwise the stripped-off thread will accumulate in loops in front of the conveyor.

When the speed of the conveyor is equal to that of the stripping roller and grooved cylinder, the cross section of the thread, as the latter is received on to and travels along with the conveyor, is preserved substantially identical, both as regards form and also dimensions, to the cross section of the coagulated deposit in the groove of the forming cylinder.

If desired, however, the thread may be drawn out after leaving the forming cylinder and to this end the conveyor may be run at a higher speed than the stripping roller, according to the desired extension to be produced in the thread, the shape of the cross section remaining, however, unaltered. The extent of possible elongation thus of the stripped thread depends among other things upon the composition of the thread. Usually an elongation of the order of 600–700% is possible and practicable, in which event the conveyor would be run at a speed of from 6 to 7 times the peripheral speed of the forming cylinder and stripping roller.

The stretching thus exercised upon the coagulated thread usually imparts a certain stiffness to the thread which tends, partially at any rate, to persist in the filament and to appear in the dried product. The said stiffness, however, may be eliminated from the thread by leading it before drying through a bath of hot water or through a sufficiently heated atmosphere. Alternatively, the stiffness may be removed after drying but before vulcanization by the same means. Or, if the dried thread is subsequently heat-vulcanized and the temperature of vulcanization is sufficiently elevated, for example not lower than 90° C., the stiffness may be removed during the vulcanization step, especially if the commencement of vulcanization at the temperature stated is not too rapid.

As will be appreciated, it is an advantage of the present invention that by simply regulating the quantity of dispersion flowed into the grooves and thereby the depth of the deposit therein, the size of the thread produced can be controlled at will; that is to say, the same grooved surface (which is always the most expensive element of a machine for carrying these processes into effect) can be used for the production of various counts of thread.

The grooves have to be highly smooth and for this purpose kept clean in order to facilitate the stripping of the coagulated deposit. To this end, the cylinder, which is preferably composed of stainless steel or a like non-corrosive smooth surfaced material, is cleaned by a set of rotary brushes the bristles of which penetrate the grooves of the cylinder. These brushes are situated between the stripping roller and the distributor tubes which deliver the latex into the grooves of the forming cylinder.

The grooves of the forming cylinder may have a cross-section of any desired configuration. The configuration whatever it be, is exactly reproduced in the section of the thread.

In the case of a deep groove which in the process is only partially filled with latex a meniscus forms at the surface of the latex deposit in the groove with the result that the deposit sets with a concave upper surface. With increase of viscosity, however, the latex shows lessening tendency to form a meniscus and in consequence the deposit in the groove sets with a more plane surface. Moreover, by coating the surface of the groove with a thin film of anti-wetting medium, for example an oily substance or powdered talc, the surface of the deposit of latex in the groove may be caused to assume the obverse of a meniscus with the result that the deposit sets with a convex upper surface.

It will be appreciated, therefore, that by controlling the viscosity of the latex or by regulating the surface tension as between the latex and the surface of the groove, the configuration of the upper portion (in the groove) of the cross-section of the coagulated deposit may be predetermined at will.

Further in this connection, it may be remarked that a convex upper surface of the deposit in the groove may also be obtained by employing a groove of such a depth that to receive the necessary quantity of latex to give a thread of the desired count it has to be slightly over-filled, the excess of latex in the groove upstanding therefrom by surface tension effect so that when set the deposit has a convex upper surface. When so operating, it is possible by employing a groove of semi-circular cross-section to produce threads the section of which is practically circular.

The invention contemplates the use of any aqueous dispersion of rubber, whether natural or artificial and whether unvulcanized or vulcanized. A mixture of different dispersions may be used, and the dispersion may be either of normal rubber content or concentrated. Also, the rubber of the dispersion may either be natural rubber or synthetic rubber. Finally, the dispersion may contain vulcanizing ingredients, dyestuffs, fillers or any other of the usual addenda of the art.

What I claim and desire to secure by Letters Patent of the United States is:—

1. A process for making rubber thread, strip and like filamentary material of a predetermined cross-sectional area, which comprises depositing in fluid condition in a forming groove a quantity of heat-sensitized aqueous rubber dispersion sufficient upon subsequent mass-setting and drying to give a solid rubber filament of the predetermined cross-sectional area, the groove being progressively moved past a nozzle directing a fine stream of the dispersion into the groove, mass-setting the deposit in the groove by heating it therein, stripping the resulting filament from the groove prior to drying the same and drying the stripped filament.

2. A process for making rubber thread, strip and like filamentary material of a predetermined cross-sectional area, which comprises depositing in fluid condition in a forming groove a quantity of heat-sensitized vulcanizable aqueous rubber dispersion sufficient upon subsequent mass-setting, drying and vulcanization to give a solid rubber filament of the predetermined cross-sectional area, the groove being progressively moved past a nozzle directing a fine stream of the dispersion into the groove, mass-setting the deposit in the groove by heating it therein, stripping the resulting filament from the groove prior to drying the same and drying and vulcanizing the stripped filament.

3. A process for making rubber thread, strip and like filamentary material of a predetermined cross-sectional area, which comprises depositing in fluid condition in a forming groove a quantity of heat-sensitized vulcanizable aqueous rubber dispersion sufficient upon subsequent mass-setting, drying and vulcanization to give a solid rubber filament of the predetermined cross-sectional area, the groove being progressively moved past a nozzle directing a fine stream of the dispersion into the groove, mass-setting the deposit in the groove by heating it therein from the surface of the groove, stripping the resulting filament from the groove prior to drying the same and drying and vulcanizing the stripped filament.

4. A process for making rubber thread, strip and like filamentary material of a predetermined cross-sectional area, which comprises depositing in fluid condition in a forming groove a quantity of heat-sensitized vulcanizable aqueous rubber dispersion sufficient upon subsequent mass-setting, drying and vulcanization to give a solid rubber filament of the predetermined cross-sectional area, the groove being progressively moved past a nozzle directing a fine stream of the dispersion into the groove, mass-setting the deposit in the groove by passing it in position therein through a heated atmosphere and simultaneously heating it from the surface of the groove, stripping the resulting filament from the groove prior to drying the same and drying and vulcanizing the stripped filament.

UGO PESTALOZZA.